J. T. Grose,
Wash Boiler.
No 4,141. Reissued Oct. 4. 1870.
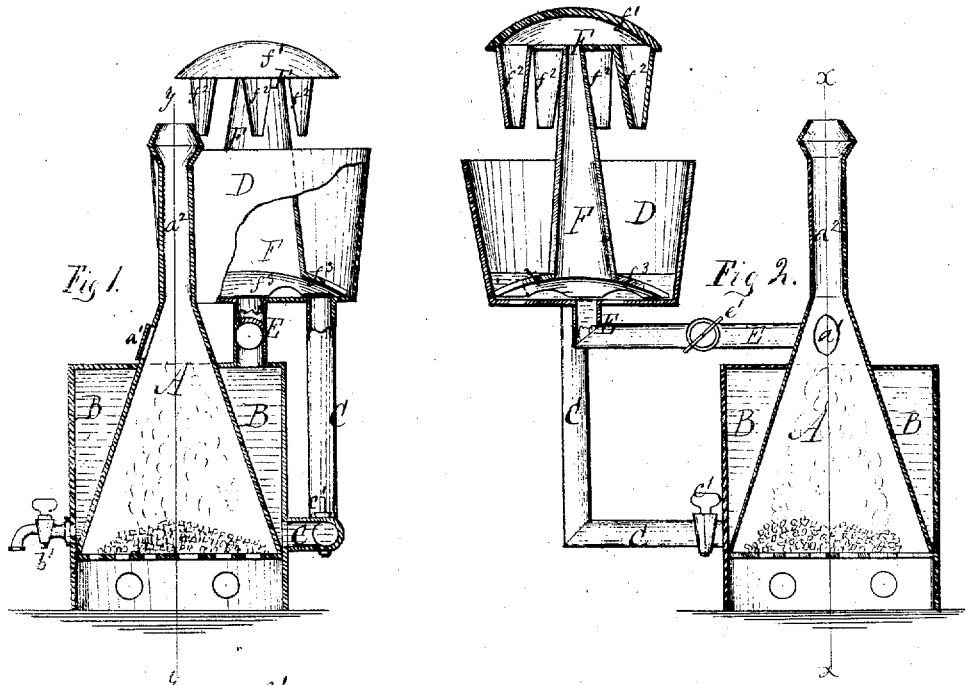
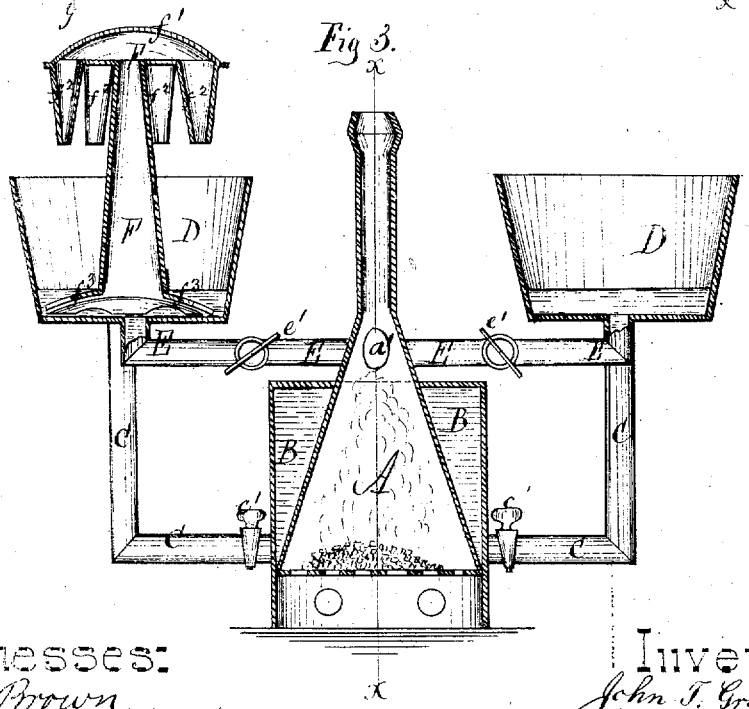
Witnesses:
E. R. Brown.
P. H. Sweet Jr.
Inventor:
John T. Grose
by T. C. Theaker
Attorney
N. PETERS, PHOTO-LITHOGRAPHER, WASHINGTON, D. C.

United States Patent Office.

JOHN T. GROSE, OF UPPER SANDUSKY, OHIO, ASSIGNOR TO HIMSELF AND WILLIAM E. KINNEAR, OF SAME PLACE.

Letters Patent No. 98,585, dated January 4, 1870; reissue No. 4,141, dated October 4, 1870.

IMPROVEMENT IN WASHING APPARATUS.

The Schedule referred to in these Letters Patent and making part of the same

*To all whom it may concern:*

Be it known that I, JOHN T. GROSE, of Upper Sandusky, in the county of Wyandot and State of Ohio, have invented a new and useful improved Steam Washing Apparatus; and I do hereby declare that the following is a full, clear, and exact description thereof, sufficient to enable those skilled in the art to which my invention appertains to make and use the same, reference being had to the accompanying drawing making part of this specification, and to the letters of reference marked thereon.

The nature of my invention consists in the arrangement of one or more tubs, steam-pipes, and water-pipes in such a manner, with relation to each other, and a boiler and furnace, as to furnish a simple, convenient, and efficient machine, by which the clothes are quickly and thoroughly washed by the circulation of steam and hot water. Also, in so constructing the apparatus as to allow the dirty water to be drawn off and replaced by clean hot water, when desired.

In the drawing—

Figure 1 is a detail vertical section of my improved apparatus taken through the line *x x* of figs. 2 and 3.

Figures 2 and 3 are detail vertical sections taken through the line *y y* of fig. 1.

A is a furnace, which I prefer to make conical, but which may be made of any other convenient form, and which is surrounded with a boiler, B, in which the water is heated.

Fuel is introduced into the furnace A through an opening, $a^1$, in its upper part, above the boiler B, as shown in figs. 1, 2, and 3.

C is a pipe, leading out from the lower part of the boiler B, provided with a stop-cock, *c'*, so as to turn off the water, when desired.

The upper end of the pipe C is securely connected with the bottom of the wash-tub D, or other receiving vessel.

The pipe C should be made in two parts, coupled together, so that the tub D may be detached and replaced with a steamer, or other vessel, according to the purpose for which the apparatus is to be used.

E is a pipe, the lower end of which is connected with the upper part of the boiler B. The upper end of the pipe E is connected with the bottom of the vessel D, preferably with the middle part of said bottom, as shown.

The pipe E is provided with a stop-cock, *e'*, so that the water or steam may be shut off, when desired.

The furnace A is provided with a smoke-pipe, $a^2$, in the ordinary manner, and the boiler B is provided with a faucet, *b'*, through which the water contained in it may be drawn off, when required.

The tub D, into which the clothes are placed to be washed, is provided with a steam-pipe, F, the upper end of which is enlarged, or has a close cap or head, $f^1$, with a cone-shaped top attached to it, from the bottom of which six small tubes or pipes, $f^2$, project downward around the body of the pipe F, as shown, so that the steam and water may be projected upon all parts of the clothes placed in the said tub around the said pipe F.

The base, $f^3$, of the pipe F is made with shallow scallops around its edge, and with angular depressions around each scallop, the parts of the edge between the scallops being turned down to form feet for the said pipe to stand upon.

By this construction the water can readily escape from the tub and flow back into the boiler, to be again heated, and again projected upon the clothes.

If desired, there may be two or more of the tubs D, and the pipes C and E may be multiplied, so as to communicate with the desired number of tubs. In such case they may be connected with the boiler B, either separately or by means of a connection-pipe, as shown in fig. 1.

If desired, one of the tubs or vessels may be used simply as a hot-water reservoir. In such case, the stop-cocks in the pipes connecting this tub with the upper and lower parts of the boiler B, being opened, the water is allowed to circulate through the boiler, pipes, and the tub or reservoir, until the water in said reservoir has been thoroughly heated. These stop-cocks are then closed and the others opened, allowing the hot water and steam to circulate through the boiler, pipes, pipe F, and the other tub, washing the clothes.

When the water has become dirty it is drawn off through the faucet *b'*, and hot water again admitted from the other tub or vessel D, to continue the operation. This construction also allows the clothes to be rinsed without removing them from the tub.

Having thus described my invention,

I claim as new and desire to secure by Letters Patent—

1. The tub D, provided with the pipe F $f^1$ $f^2$ $f^3$, arranged and operating substantially as shown and described.

2. The arrangement of one or more tubs D, the steam-pipe F $f^1$ $f^2$ $f^3$, and pipes C and E, with reference to each other, and the boiler B, and furnace A, substantially as herein shown and described.

JOHN T. GROSE.

Witnesses:

A. W. BRINKERHOFF,

J. A. MAXWELL.